United States Patent [19]

Farmer, Jr. et al.

[11] Patent Number: 5,112,397
[45] Date of Patent: May 12, 1992

[54] PROCESS FOR STABILIZING ZINC PYRITHIONE PLUS CUPROUS OXIDE IN PAINT

[75] Inventors: Douglas A. Farmer, Jr., Madison; Rahim Hani, Cheshire; Craig Waldron, Waterbury, all of Conn.

[73] Assignee: Olin Corporation, Cheshire, Conn.

[21] Appl. No.: 716,415

[22] Filed: Jun. 17, 1991

[51] Int. Cl.$^5$ .............................. C09D 5/14
[52] U.S. Cl. ...................... 106/18.33; 106/15.05; 106/16; 106/18.32; 106/18.34; 71/67; 514/188; 514/345; 514/499; 514/500
[58] Field of Search ............ 106/15.05, 16, 18.32, 106/18.33, 18.34; 71/67; 514/188, 345, 499, 500

[56] References Cited

U.S. PATENT DOCUMENTS

| | | | |
|---|---|---|---|
| 3,615,744 | 10/1971 | Yokoo et al. | 106/15.05 |
| 4,039,312 | 8/1977 | Patru | 106/16 |
| 4,581,351 | 4/1986 | Belke et al. | 514/345 |
| 4,918,147 | 4/1990 | Yamamori et al. | 424/78 |

Primary Examiner—William R. Dixon, Jr.
Assistant Examiner—Anthony J. Green
Attorney, Agent, or Firm—Dale Lynn Carlson

[57] ABSTRACT

The present invention relates generally to paints and paint bases, and, more specifically to a process and composition for providing a stable gel-free dispersion of zinc pyrithione plus cuprous oxide biocide in paint. In accordance with the process of the present invention, the paint or paint base contains an amine compound or esterified wood rosin in order to impart desired gelation-inhibition to the paint.

16 Claims, No Drawings

PROCESS FOR STABILIZING ZINC PYRITHIONE PLUS CUPROUS OXIDE IN PAINT

FIELD OF THE INVENTION

The present invention relates generally to paints and paint bases, and, more specifically to a process for providing a stable, gel-free dispersion OF zinc pyrithione plus cuprous oxide biocide in paint.

BACKGROUND OF THE INVENTION

Combinations of zinc pyrithione and cuprous oxide are known to be excellent antifouling agents when formulated into paints and paint bases (i.e., the paint before pigment addition), as disclosed. for example, in copending U.S. application Ser. No. 07/518,602. Unfortunately, however, such paints have now been found to thicken or gel unacceptably within a few days, at best, or a few hours, at worst, when formulated with typical commercial grades of zinc pyrithione in combination with cuprous oxide.

Heretofore, the solution to the problem of gellation of paints containing zinc pyrithione in combination with cuprous oxide has not been known to the knowledge of the present inventors. A solution to the problem would be highly desired by the paint manufacturing community since this combination of biocides provides excellent biocidal activity.

SUMMARY OF THE INVENTION

In one aspect, the present invention relates to a process for providing a gellation-inhibited paint or paint base containing zinc pyrithione and cuprous oxide which comprises the steps of:

(a) adding said zinc pyrithione and also adding cuprous oxide to a paint or paint base to provide a paint or paint base characterized by enhanced biocidal efficacy and resistance to gellation. said zinc pyrithione being present in an amount of between about 1% and about 25% (preferably 5-25%, more preferably 10-25%), and said cuprous oxide being present in an amount of between about 20% and about 70%, the total amount of said pyrithione salt plus said cuprous oxide being between about 20% and about 80% (preferably 20-75%) based upon the total weight of the paint or paint base, (b) adding to said paint or paint base an amine of the formula $(NH_2)_x R_1 NH_2$, where x is 0 or 1 and $R_1$ is $C_1$ to $C_{10}$ alkyl, alkenyl, alkynyl, cycloalkyl, or cycloalkynyl, to a solution of an appropriate polymer resin in a suitable solvent or solvents, said amine being present in an amount of between about 0.1% and 15% (preferably 0.1-5%, more preferably 0.5-3%), based upon the total weight of the paint or paint base, and (c) adding wood rosin optionally esterified by an alcohol of the formula $(HO)_y R_2 OH$, where y is 0 or 1 and $R_2$ is $C_1$ to $C_{10}$ alkyl, alkenyl, alkynyl, cycloalkyl, or cycloalkynyl, said wood rosin or rosin ester being present in a n amount of between about 1% and 20% (preferably 2-15%, more preferably 4-10%), based upon the total weight of the paint or paint base.

In other aspects, the present invention relates to the above process wherein the steps (a) through (c) are conducted step-wise or simultaneously to provide the desired paint or paint base stabilized against gellation.

In another aspect, the present invention relates to a paint or paint base composition characterized by enhanced biocidal efficacy and gellation resistance wherein the paint or paint base contains a biocide consisting essentially of cuprous oxide and zinc pyrithione and wherein the paint or paint base is stabilized against gelation by virtue of the presence therein of the above-described amine compound or esterified wood rosin.

These and other aspects of the invention will become apparent upon reading the following detailed description of the invention.

DETAILED DESCRIPTION OF THE INVENTION

Although the improved biocidal efficacy and gellation resistance advantages associated with the present invention are expected to provide advantages when used in a wide variety of paints, including indoor and outdoor household paints, industrial and commercial paints, particularly advantageous results are obtained when the process and composition of the present invention are utilized in conjunction with marine paints for use, for example, on ship's hulls. In addition, the composition and process of the present invention provides highly desirable results in the context of exterior paints of both the latex and alkyd types.

Typically, a paint composition will contain a resin, a pigment, and various optional additives such as thickening agent(s), wetting agents, and the like, as is well-known in the art. The resin is preferably selected from the group consisting of vinyl, alkyd, epoxy, acrylic, polyurethane and polyester resins, and combinations thereof. The resin is preferably employed in an amount of between about 20% and about 80% based upon the weight of the paint or paint base.

In addition, the paint composition of the present invention optionally additionally contains optional additives which have a favorable influence on the viscosity, the wetting power and the dispersibility, as well as on the stability to freezing and electrolytes and on the foaming properties. If a marine paint is being fabricated, the paint preferably contains a swelling agent to cause the paint to gradually "slough off" in its marine environment, thereby causing renewed biocidal efficacy of newly exposed biocide (i.e., the pyrithione salt plus the copper salt) at the surface of the paint in contact with the water medium of the marine environment Illustrative swelling agents are naturally-occurring or synthetic clays, such as kaolin, montomorillonite bentonite), clay mica (muscovite), and chlorite (hectonite), and the like. In addition to clays, other swelling agents, including natural or synthetic polymers, such as that commercially available as POLYMERGEL, have been found to be useful in the compositions of the present invention to provide the desired "sloughing off" effect. Swelling agents can be used singly or in combination. The total amount of optional additives is preferably no greater than 20% by weight, more preferably between about 1% and about 5% by weight, based upon the total weight of the paint composition.

Illustrative thickening agents include cellulose 30 derivatives, for example methyl, hydroxyethyl, hydroxypropyl and carboxymethyl cellulose, poly(vinyl alcohol), poly (vinylpyrolidone), poly(ethylene-glycol), salts of poly(acrylic acid) and salts of acrylic acid/acrylamide copolymers.

Suitable wetting and dispersing agents include sodium polyphosphate, salts of low-molecular-weight poly(acrylic acid), salts of poly(ethane-sulfonic acid), salts of poly (vinyl-phosphonic acid), salts of poly(maleic acid) and salts of copolymers of maleic acid with ethylene, 1-olefins with 3 to 18 carbon atoms and/or styrene.

In order to increase the stability to freezing and electrolytes there may be added to the paint composition various monomer 1,2-diols, for example glycol, propylene-glycol-(1,2), and butylene-glycol-(1,2) or polymers thereof, or ethoxylated compounds, for example reaction products of ethylene oxide with long-chain alkanols, amines, carboxylic acids, carboxylic acid amides, alkyd phenols, poly(propylene-glycol) or poly(butylene-glycol).

The minimum temperature of film formation (white point) of the paint composition may be reduced by adding solvents, such as ethylene-glycol, butyl-glycol, ethyl-glycol acetate, ethyl-diglycol acetate, butyl-diglycol acetate, benzene or alkylated aromatic hydrocarbons. As defoaming agents there are suitable for example poly(propylene-glycol) and polysiloxanes.

The paint composition of the present invention may be used as a paint for natural or synthetic materials, for example wood, paper, metals, textiles and plastics. It is particularly suitable as an outdoor paint, and is excellent for use as a marine paint.

The invention is further illustrated by the following Examples. Unless otherwise stated, the "parts" and "%" are "parts by weight" and "percent by weight", respectively.

While the invention has been described above with references to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

COMPARATIVE EXAMPLE A

Demonstration of Gellation Results in a Paint Containing Cuprous Oxide Plus Crude Zinc Pyrithione A paint was prepared using the following formulation:

The solvent mixture used was a 1:2:1 mixture of xylene MIBK and carbitol acetate (called mixed solvent).

The zinc pyrithione used was standard commercial grade and assayed 97.8% pure by iodometric titration.

| *Material | Parts | % |
|---|---|---|
| VAGH resin (1) | 9.3 | 2.8 |
| DISPERBYK 163 (2) | 5.1 | 1.5 |
| Tributyl Phosphate | 6.45 | 2.0 |
| Cuprous Oxide | 136.5 | 41.4 |
| TITANOX (3) | 7.5 | 2.3 |
| Zinc pyrithione powder | 25.5 | 7.7 |
| Wood Rosin | 6.3 | 1.9 |
| Solvent Mixture | 133.0 | 40.0 |

(1) vinyl chloride-vinyl acetate-vinyl alcohol terpolymer, a product of Union Carbide Corporation.
(2) a high molecular weight block copolymer, a product of BYK-Chemie.
(3) titanium dioxide, a product of DuPont Company.

The procedure employed for preparing the paint was as follows:
(1) A one pint paint can was charged with 41.93 g of a 22.2% VAGH resin solution in a 2:1 mixture by volume of MIBK and xylene.
(2) A mixture of 5.1 g Disperbyk 163 and 5.1 g mixed solvent was added.
(3) Tributyl phosphate was added to the paint can and mixed with a high speed disperser at 1000 RPM for 10 minutes.
(4) The cuprous oxide, zinc pyrithione, titanox, and 10.8 g carbitol acetate were added to the paint can and mixing was continued at 7000 RPM for 1 hr.
(5) The mixing speed was reduced to 2500 RPM and 35 g of mixed solvent was added.
(6) Once the temperature dropped from 45° C. to below 35°, a solution of 6.3 g of wood rosin in 50 g of mixed solvent was added to the can and the mixture was mixed for 1.0 hr. at 2500 RPM.

The paint formulation made according to this procedure was of suitable viscosity for application by brush immediately after preparation, but thickened to an unpourable paste after approximately 6 hours.

EXAMPLE 1

Demonstration of Reduced Gellation in a Paint Containing Cuprous Oxide and Zinc Pyrithione by Addition of an Amine A paint was prepared using the following formulation:

| *Material | Parts | % |
|---|---|---|
| VAGH Resin | 8.1 | 3.05 |
| Disperbyk 163 | 6.0 | 2.26 |
| 1,3-Diaminopropane | 3.3 | 1.24 |
| Cuprous Oxide | 145.0 | 54.59 |
| Zinc Pyrithione | 14.0 | 5.27 |
| Tricresyl Phosphate | 7.2 | 2.71 |
| Wood Rosin WW | 14.0 | 5.27 |
| Solvent Mixture | 68.0 | 25.60 |

Procedure (1) A one pint paint can was charged with the zinc pyrithione and cuprous oxide plus a mixture of 6.0 g Disperbyk 163 and 5.0 g mixed solvent. These materials were mixed with a high speed disperser at 1000 RPM for five minutes while adding 25 g mixed solvent and then the diamino-propane was added.
(2) Mixing was continued at 6000-7000 RPM for 30 minutes, adding back solvent as needed to compensate for evaporation loss.
(3) Temperature was kept below 45 degrees C. using a cooling water bath. Next a 36.8 g of a 22.2% solution of VAGH resin in mixed solvent and 7.2 g tricresyl phosphate was added. Mixing was continued for 30 minutes at 5000 RPM.
(4) The rosin WW dissolved in 25 g mixed solvent was added and mixing continued for one hour at 4000 RPM.
(5) Mixed solvent was added back as necessary to compensate for evaporation losses.

In contrast to the paint of Comparative Example A, this paint remained of suitable viscosity to application by brush 8 weeks after its preparation.

EXAMPLE 2

Demonstration of Reduced Gellation in a Paint Containing Cuprous Oxide and Zinc Pyrithione by Addition of Rosin Ester A paint was prepared using the following formulation:

| *Material | Parts | % |
| --- | --- | --- |
| VAGH Resin | 8.10 | 3.02 |
| Disperbyk 163 | 6.00 | 2.24 |
| Cuprous Oxide | 150.00 | 55.91 |
| Zinc Pyrithione | 14.00 | 5.22 |
| Tricresyl Phosphate | 7.20 | 2.68 |
| Rosin Glycolate (1) | 14.00 | 5.22 |
| Solvent Mixture | 69.00 | 25.72 |

(1) Rosin glycolate is the ethylene glycol ester of wood rosin WW and is a product of the Arizona Chemical Company Procedure (1) A one pint paint can was charged with 36.8 g of a 22.2% solution of VAGH resin in mixed solvent and a mixture of 6.0 g Disperbyk 163 in 5.0 g mixed solvent was added. The solution was mixed with a high speed disperser for 10 minutes at 1000 RPM.

(2) The cuprous oxide, zinc pyrithione and 10.8 g solvent mixture were added and mixing was continued for one hour at 7000 RPM.

(3) Temperature was maintained below 45 degrees C. with a water bath. A the tricresyl phosphate and a solution of 14.0 g rosin glycolate in 25 g mixed solvent was added and mixing was continued for one hour at 4000 RPM.

(4) Solvent mixture was added back to compensate for evaporation losses.

Like the paint of example 1, this paint had a suitable viscosity for application by brush 8 weeks after its preparation.

While the invention has been described above with references to specific embodiments thereof, it is apparent that many changes, modifications and variations in the material, arrangements of parts and steps can be made without departing from the inventive concept disclosed herein. Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A paint or paint base composition characterized by enhanced biocidal efficacy and gellation resistance wherein the paint or paint base contains a biocide consisting essentially of cuprous oxide and zinc pyrithione, and the paint or paint base further comprises an amine of the formula $(NH_2)_x R_1 NH_2$, where x is 0 or 1 and $R_1$ is $C_1$ to $C_{10}$ alkyl, alkenyl, alkynyl, cycloalkyl, or cycloalkynyl, and wood rosin or esterified wood rosin esterified by an alcohol of the formula $(HO)_y R_2 OH$, where y is 0 or 1 and $R_2$ is $C_1$ to $C_{10}$ alkyl, alkenyl, alkynyl, cycloalkyl, or cycloalkynyl, said zinc pyrithione being present in an amount of between about 1% and about 25% and said cuprous oxide being present in an amount of between about 20% and about 70%, the total amount of said pyrithione salt plus said cuprous oxide being between about 20% and about 80% based upon the total weight of the paint or paint base, said amine being present in an amount of between 0.1% and 15% based upon the total weight of the paint or paint base composition, and said wood rosin or esterified wood rosin being present in an amount of between about 1% and 20% based upon the total weight of the paint or paint base.

2. The paint or paint base of claim 1 wherein the total amount of said cuprous oxide and zinc pyrithione is between about 20% and about 75% based upon the total weight of the paint or paint base composition.

3. The paint or paint base of claim 1 wherein the amount of said amine is between about 0.1% and 5% based upon the total weight of the paint or paint base composition.

4. The paint or paint base of claim 1 wherein the amount of said wood rosin or esterified wood rosin is between about 2% and 15% based upon the total weight of the paint or paint base composition.

5. The paint or paint base of claim 1 which additionally contains a resin selected from the group consisting of vinyl, alkyd, epoxy, acrylic, polyurethane and polyester resins, and combinations thereof.

6. The paint or paint base of claim 1 which additionally contains a swelling agent selected from the group consisting of natural and synthetic clay and natural and synthetic polymer swelling agents.

7. A process for providing a gellation-inhibited paint or paint base containing zinc pyrithione and cuprous oxide which comprises the steps of:
  (a) adding said zinc pyrithione and also adding cuprous oxide to a paint or paint base to provide a paint or paint base characterized by enhanced biocidal efficacy and resistance to gellation, said zinc pyrithione being present in an amount of between about 1% and about 25%, and said cuprous oxide being present in an amount of between about 20% and about 70%, the total amount of said cuprous oxide and zinc pyrithione oxide being between about 20% and about 80% based upon the total weight of the paint or paint base,
  (b) adding to said paint or paint base an amine of the formula $(NH_2)_x R_1 NH_2$, where x is 0 or 1 and $R_1$ is $C_1$ to $C_{10}$ alkyl, alkenyl, alkynyl, cycloalkyl, cycloalkynyl, or a polymer resin in solvent said amine being present in an amount of between about 0.1% and 15%, based upon the total weight of the paint or paint base, and
  (c) adding wood rosin or esterified wood rosin esterified by an alcohol of the formula $(HO)_y R_2 OH$, where y is 0 or 1 and $R_2$ is $C_1$ to $C_{10}$ alkyl, alkenyl, alkynyl, cycloalkyl, or cycloalkynyl, said wood rosin or esterified wood rosin being present in an amount of between about 1% and 20%, based upon the total weight of the paint or paint base.

8. The process of claim 7 wherein the total amount of said cuprous oxide and zinc pyrithione is between about 20% and about 75% based upon the total weight of the paint or paint base composition.

9. The process of claim 7 wherein the total amount of said amine is between about 0.1% and 5% based upon the total weight of the paint or paint base composition.

10. The process of claim 7 wherein the total amount of said wood rosin or esterified wood rosin is between about 2% and 15% based upon the total weight of the paint or paint base composition.

11. The process of claim 7 wherein said composition additionally contains a resin selected from the group consisting of vinyl, alkyd, epoxy, acrylic, polyurethane and polyester resins, and combinations thereof.

12. The process of claim 7 wherein said composition additionally contains a swelling agent selected from the group consisting of natural and synthetic clay and natural and synthetic polymer swelling agents.

13. The process of claim 7 wherein steps (a) and (b) are carried out simultaneously.

14. The process of claim 7 wherein steps (a), (b) and (c) are carried out simultaneously.

15. The process of claim 7 wherein step (b) is omitted and step (c) is carried out using esterified wood rosin.

16. The process of claim 12 wherein said swelling agent is selected from the group consisting of kaolin, montomorillonite (bentonite), clay mica (muscovite), and chlorite (hectonite), and combinations thereof.

* * * * *